US012675657B2

(12) United States Patent
Horner et al.

(10) Patent No.: US 12,675,657 B2
(45) Date of Patent: Jul. 7, 2026

(54) MULTI-FACTOR AUTHENTICATION OF A PROOF OF DELIVERY IMAGE USING A COLOR IMAGING FOR BARCODE AND LOCATION INFORMATION

(71) Applicant: Zebra Technologies Corporation, Lincolnshire, IL (US)

(72) Inventors: Matthew Lawrence Horner, Sound Beach, NY (US); Maulin Sheth, Central Islip, NY (US); Yuri Astvatsaturov, Lake Forest, IL (US); Nina Feinstein, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/923,370

(22) Filed: Oct. 22, 2024

(65) Prior Publication Data

US 2026/0111696 A1     Apr. 23, 2026

(51) Int. Cl.
  *G06K 7/14*        (2006.01)
  *H04N 1/32*        (2006.01)
(52) U.S. Cl.
  CPC ....... *G06K 7/1447* (2013.01); *H04N 1/32128* (2013.01); *H04N 2201/3253* (2013.01); *H04N 2201/3269* (2013.01)

(58) Field of Classification Search
  CPC ............ G06K 7/1447; H04N 1/32128; H04N 2201/3253; H04N 2201/3269
  See application file for complete search history.

(56) References Cited

U.S. PATENT DOCUMENTS 11,350,024 B1 *   5/2022   Stallman ................ H04N 23/64

* cited by examiner

*Primary Examiner* — Matthew Mikels

(57) ABSTRACT

Imaging devices, systems, and methods for performing image analysis operations on an object that is partially mirrored are described herein. An example device includes: an imaging assembly including at least one imaging sensor having capability to capture monochromatic image data and color image data; and a computer-readable medium storing machine readable instructions that, when executed, cause the one or more processors to: capture, via the imaging assembly, image data of the object in the FOV, the image data including decode indicia data; decode the decode indicia data to generate scan data associated with the object; responsive to decoding the decode indicia data, capture, via the imaging assembly, one or more color images of the object in the FOV; and when at least one color image of the object meets a predetermined criterion, automatically associate the scan data with the color image.

19 Claims, 7 Drawing Sheets

MULTI-FACTOR AUTHENTICATION OF A PROOF OF DELIVERY IMAGE USING A COLOR IMAGING FOR BARCODE AND LOCATION INFORMATION

BACKGROUND

When delivering items or packages to a location, the delivery driver and/or courier often takes a picture of the package as a proof of delivery (PoD) that is subsequently uploaded for the service and/or the customer as proof that the delivery was successful. However, as packages often look the same and the surrounding area in the picture may lack distinguishing features, packages are often delivered to the incorrect address and/or are mistakenly swapped with other packages during delivery. Moreover, such techniques often require manual review by a customer to verify, so it can take hours to days before a discrepancy is noticed and/or reported, requiring additional infrastructure to address. Conventional attempts to address such concerns require additional steps to be introduced into the process, slowing the overall timing and efficiency of the delivery process, as well as requiring additional bandwidth and/or infrastructure to handle additional verification steps. For example, conventional attempts to address such concerns may have a user separately scan a barcode and capture an image by using separate devices, separate applications, and/or separate portions of the device (e.g., turning an imaging device to scan with different portions of the device for different functionalities). As such, a system that is able to verify and/or provide information for verifying the delivery process alongside the generation of the PoD without hindering the overall delivery process is desirable.

SUMMARY

In some aspects, the techniques described herein relate to an imaging device including: one or more processors; an imaging assembly including at least one imaging sensor having capability to capture monochromatic image data and color image data, the imaging assembly configured to capture image data of an object appearing in a field of view (FOV); and a computer-readable medium storing machine readable instructions that, when executed, cause the one or more processors to: capture, via the imaging assembly, image data of the object in the FOV, the image data including decode indicia data; decode the decode indicia data to generate scan data associated with the object; responsive to decoding the decode indicia data, capture, via the imaging assembly, one or more color images of the object in the FOV; and when at least one of the one or more color images of the object in the FOV meets a predetermined criterion, automatically associate the scan data with the at least one of the one or more color images of the object in the FOV.

In some aspects, the techniques described herein relate to an imaging device, wherein the predetermined criterion is a sharpness criterion.

In some aspects, the techniques described herein relate to an imaging device, wherein associating the scan data with the at least one of the one or more color images includes: determining a subset of the at least one of the one or more color images with a sharpness metric that meets the sharpness criterion; and associating a color image of the subset with the scan data, wherein the color image of the subset has a highest sharpness metric of the subset.

In some aspects, the techniques described herein relate to an imaging device, wherein associating the scan data with the at least one of the one or more color images includes: detecting that a first color image of the one or more color images meets the sharpness criterion; and responsive to the detecting, associating the first color image with the scan data.

In some aspects, the techniques described herein relate to an imaging device, wherein the computer-readable medium stores further machine readable instructions that, when executed, further cause the one or more processors to: retrieve global positioning system (GPS) coordinates for the imaging device; and when the at least one of the one or more color images meets the predetermined criterion, automatically associate the GPS coordinates with the scan data and the at least one of the one or more color images.

In some aspects, the techniques described herein relate to an imaging device, wherein the imaging device includes a GPS component, and retrieving the GPS coordinates includes: retrieving the GPS coordinates from the GPS component.

In some aspects, the techniques described herein relate to an imaging device, wherein associating the GPS coordinates with the scan data and the at least one of the one or more color images includes: appending metadata associated with the GPS coordinates with the scan data and the at least one of the one or more color images.

In some aspects, the techniques described herein relate to an imaging device, wherein capturing the one or more color images includes: capturing a predetermined quantity of color images.

In some aspects, the techniques described herein relate to an imaging device, wherein capturing the one or more color images includes: capturing the one or more color images continuously until a color image of the one or more color images meets the sharpness criterion.

In some aspects, the techniques described herein relate to an imaging device, wherein capturing the image data is responsive to a trigger event, and decoding the image data is responsive to capturing the image data.

In some aspects, the techniques described herein relate to an imaging device, wherein the at least one sensor includes at least one of a color sensor or a long-range monochrome sensor.

In some aspects, the techniques described herein relate to a system including: an imaging engine including an imaging assembly including at least one imaging sensor having capability to capture monochromatic image data and color image data, the imaging assembly configured to capture image data of an object appearing in a field of view (FOV); and a computer-readable medium storing machine readable instructions that, when executed, cause the system to: capture, via the imaging assembly, image data of the object in the FOV, the image data including decode indicia data; decode the decode indicia data to generate scan data associated with the object; responsive to decoding the decode indicia data, capture, via the color sensor, one or more color images of the object in the FOV; and when at least one of the one or more color images of the object in the FOV meets a predetermined criterion, automatically associate the scan data with the at least one of the one or more color images of the object in the FOV.

In some aspects, the techniques described herein relate to a system, wherein the predetermined criterion is a sharpness criterion.

In some aspects, the techniques described herein relate to a system, wherein associating the scan data with the at least one of the one or more color images includes: determining a subset of the at least one of the one or more color images with a sharpness metric that meets the sharpness criterion; and associating a color image of the subset with the scan data, wherein the color image of the subset has a highest sharpness metric of the subset.

In some aspects, the techniques described herein relate to a system, wherein associating the scan data with the at least one of the one or more color images includes: detecting that a first color image of the one or more color images meets the sharpness criterion; and responsive to the detecting, associating the first color image with the scan data.

In some aspects, the techniques described herein relate to a system, wherein the computer-readable medium stores further machine readable instructions that, when executed, further cause the system to: retrieve global positioning system (GPS) coordinates for the imaging engine; and when the at least one of the one or more color images meets the predetermined criterion, automatically associate the GPS coordinates with the scan data and the at least one of the one or more color images.

In some aspects, the techniques described herein relate to a system, wherein the system includes a GPS component, and retrieving the GPS coordinates includes: retrieving the GPS coordinates from the GPS component.

In some aspects, the techniques described herein relate to a system, wherein associating the GPS coordinates with the scan data and the at least one of the one or more color images includes: appending metadata associated with the GPS coordinates with the scan data and the at least one of the one or more color images.

In some aspects, the techniques described herein relate to a system, wherein capturing the one or more color images includes: capturing a predetermined quantity of color images.

In some aspects, the techniques described herein relate to a system, wherein capturing the one or more color images includes: capturing the one or more color images continuously until a color image of the one or more color images meets the sharpness criterion.

In some aspects, the techniques described herein relate to a system, wherein capturing the image data is responsive to a trigger event, and decoding the image data is responsive to capturing the image data.

In some aspects, the techniques described herein related to a system, wherein the at least one sensor includes at least one of a color sensor or a long-range monochrome sensor.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1A:
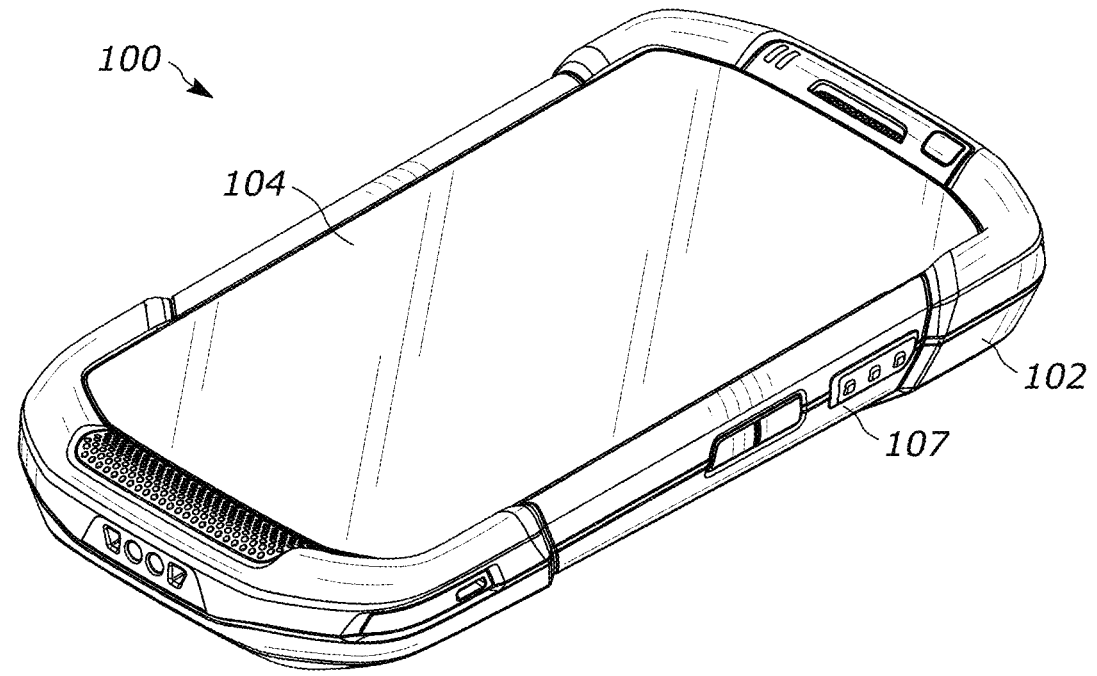
FIG. 1A illustrates a front isometric view of an example mobile device functioning as a barcode and/or indicia reader including a scan engine.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example imaging devices disclosed herein capture scan data for an indicia associated with an object (e.g., of a barcode, QR code, 2D barcode, watermark, and/or other decode indicia on an object) and color images (e.g., used as proof of delivery (PoD) of the object within a field of view (FOV) of the imaging devices using an imaging engine (and/or imaging assembly) including one or more sensors (also referred to as imaging sensors, imagers, cameras, etc.) collectively configured to capture both sets of data with a single application and/or trigger event. By capturing both the scan data and the PoD image(s) using a single application and/or trigger event, the imaging devices can ensure accuracy in delivery. For example, by appending scan data to a captured image (e.g., as metadata), the imaging device and/or a computing device communicatively coupled to the imaging device can determine that the proper package is being delivered. Further, by appending location data (e.g., global positioning system (GPS) data) to the captured image, a system can determine that the location of the delivery is correct. As such, a delivery driver and/or courier can avoid accidentally switching packages (e.g., by scanning before loading in the vehicle and mixing packages up) and accidentally delivering packages to the wrong location (e.g., by confirming the location) without requiring manual validation by the customer at a later time and/or using additional resources and slowing down the process with additional steps.

Referring to FIG. 1A, shown therein is an example imaging device (e.g., a modular imaging engine, as described with regard to FIG. 1D below) embodied in a mobile indicia reader 100. In the illustrated example, the mobile indicia reader 100 is shown as part of a cellular mobile device functioning as the mobile indicia reader 100. Generally, the mobile indicia reader 100 includes an exterior shell 102 (e.g., with additional grip, for additional protection, etc.), functioning as a housing for the mobile indicia reader 100. The mobile indicia reader 100 includes a screen 104 with user-interactable elements and/or functionalities (e.g., virtual buttons, text typing capability, selection options, image display functionality, etc.). The mobile indicia reader 100 additionally includes physical buttons 107 that function to trigger various functionalities for the mobile indicia reader 100 (e.g., in addition to or as an alternative to virtual elements displayed via the screen 104).

Figure 1B:
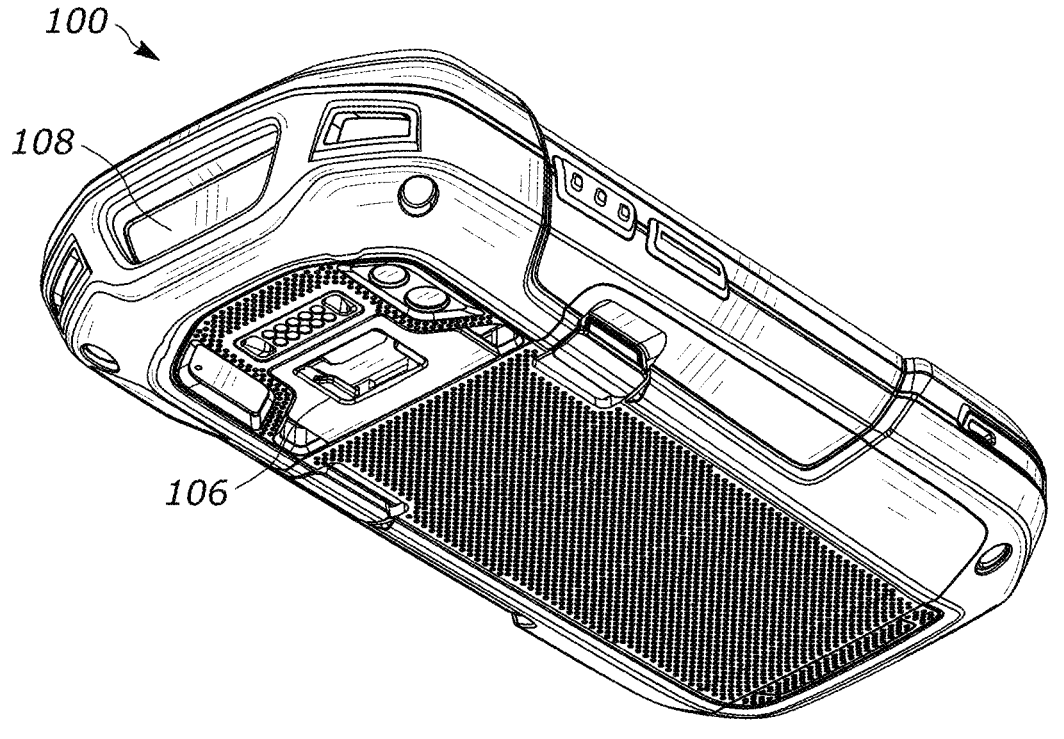
FIG. 1B illustrates a back isometric view of the example mobile device functioning as a barcode and/or indicia reader of FIG. 1A.
Figure 1C:
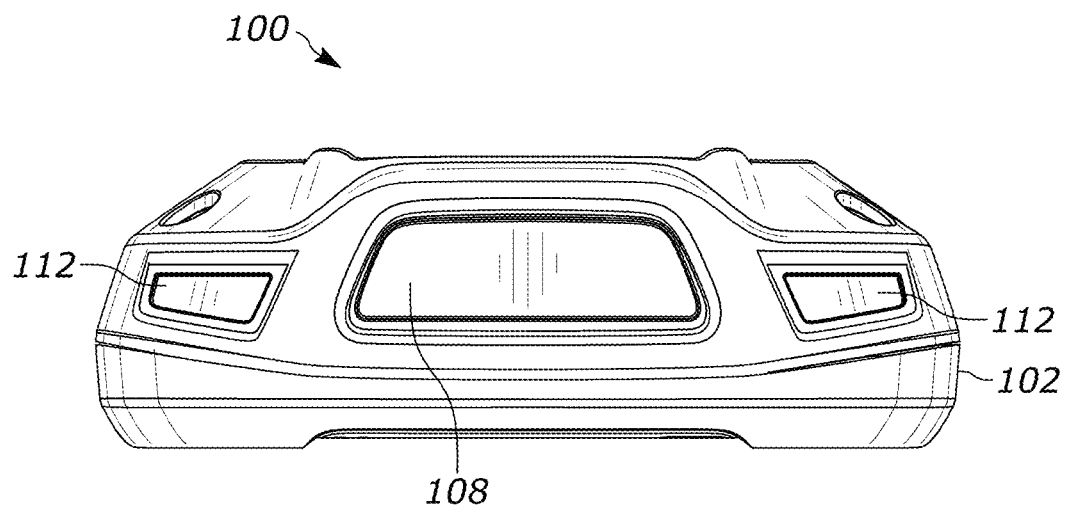
FIG. 1C illustrates a top-down perspective view of the example mobile device functioning as a barcode and/or indicia reader of FIGS. 1A and 1B.

FIG. 1B displays a reverse view of the mobile indicia reader 100, including a modular imaging engine device 106, described below with regard to FIG. 1D. Both FIG. 1B and FIG. 1C additionally illustrate a window 108 for the mobile indicia reader 100. Depending on the implementation, the window 108 is an optically transmissive window 108 positioned therein along a plane and one or more fields of view (FOV) which pass through the window 108 and extend in a generally lateral direction. In some implementations, the mobile indicia reader 100 includes one or more additional optically transmissive windows 112 positioned along the same plane and one or more FOVs, which pass through the window 112 and extend in a generally upward direction. In further implementations, the additional windows 112 may be positioned to be along another plane and one or more FOVs that do not pass through the window 108.

In operation, a user generally points the mobile indicia reader 100 at and/or passes the mobile indicia reader 100 across an object. The mobile indicia reader 100 may capture an image of the object and/or scan a decode indicia (e.g., a barcode, QR code, 2D barcode, watermark, etc.). A product scanning region can be generally viewed as a region that extends in front of the window 108, where mobile indicia reader 100 is operable to capture image data of sufficient quality to perform imaging-based operations like decoding a barcode that appears in the obtained image data. When an object comes into the any of the fields of view of the reader, an indicia on the object is captured and decoded by the mobile indicia reader 100 (and its respective modules and/or assemblies), and corresponding data (e.g., the payload of the indicia) is stored in memory and/or transmitted to a communicatively coupled host (not shown) (commonly comprised of a point of sale (POS) terminal).

Figure 1D:
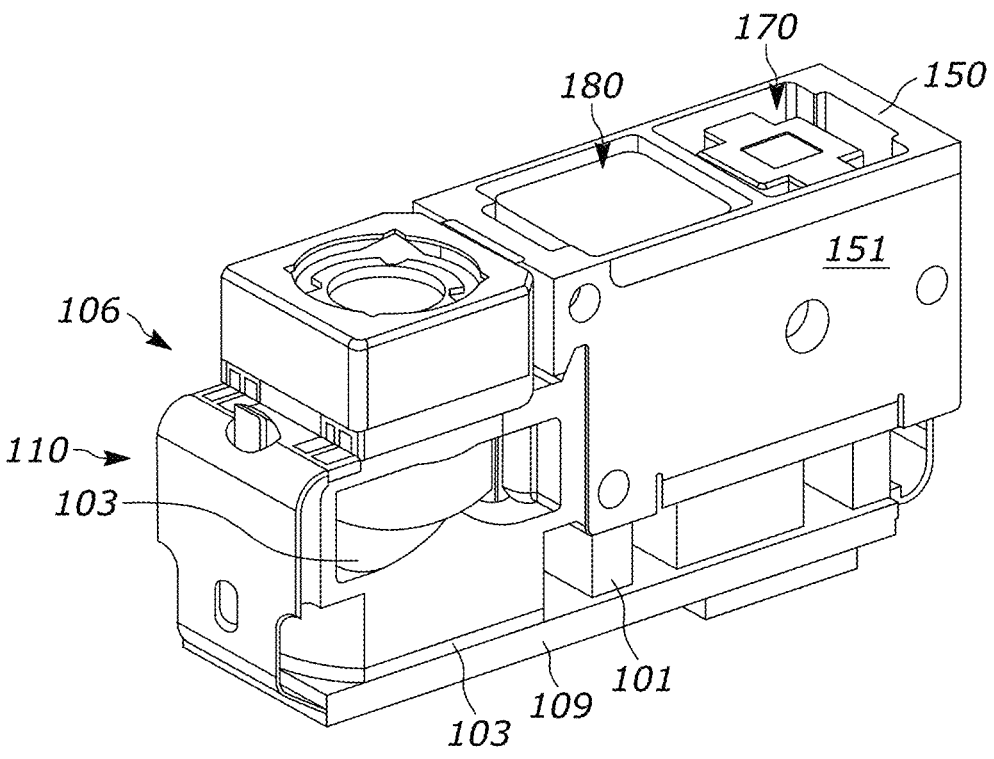
FIG. 1D illustrates an isometric view of a scan engine included in an example mobile device functioning as a barcode and/or indicia reader similar to those of FIGS. 1A-1C.

Referring next to FIG. 1D, an imaging engine device 106 (also referred to herein as a "scan engine") for capturing at least one image of an object appearing in an imaging field of view (FOV) is provided. The imaging engine device 106 includes and/or is electrically coupled to a circuit board 109 (e.g., a printed circuit board (PCB)), an imaging system 110 (also referred to herein as an "imaging assembly") operably coupled with the circuit board 109, and a chassis 150. Further, the imaging engine device 106 may include an aiming system or aiming module 170 and an illumination system and/or illumination module 180, as well as any number of additional components used to assist with capturing an image or images of an object. The aiming module 170 and/or illumination module 180 may include a light source and at least one lens, configured to generate a substantially uniform distributed aiming pattern and/or illumination pattern of illumination light on and along an object to be read by image capture, as described below with regard to FIG. 2.

The circuit board 109 may include any number of electrical and/or electro-mechanical components (e.g., capacitors, resistors, transistors, power supplies, etc.) used to communicatively couple and/or control various electrical components of the imaging engine device 106. For example, the circuit board 109 may include any number of component mounting portions 103 to receive components (e.g., the imaging system 110) to operably couple therewith, and may additionally include a board mounting region (not shown) used to secure the circuit board 109 with the shell 102 of the mobile indicia reader 100.

Figure 2:
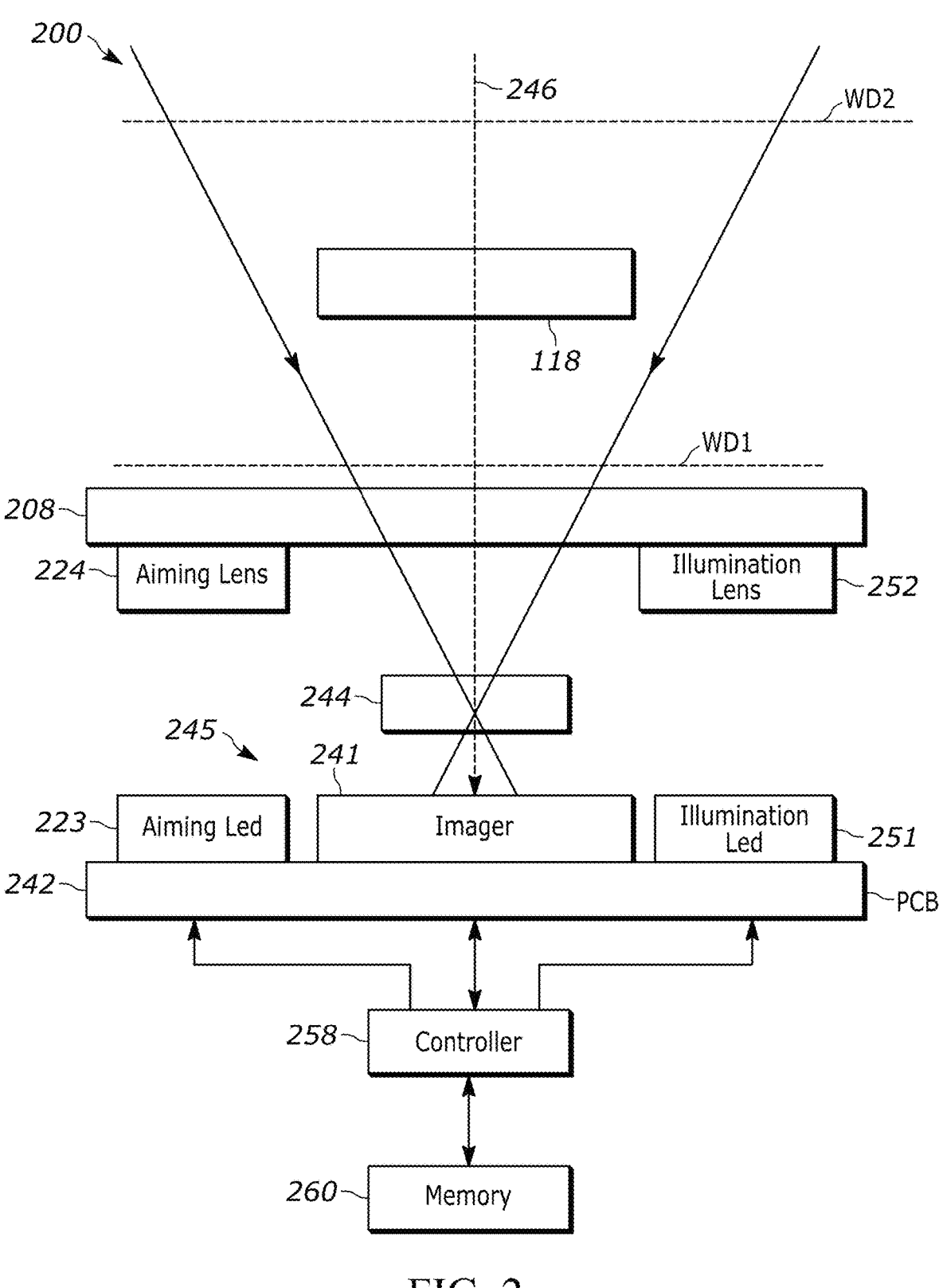
FIG. 2 illustrates a block diagram of an example imaging device such as the example mobile device functioning as a barcode and/or indicia reader of FIGS. 1A-1D.

In particular, the imaging system 110 may be communicatively coupled to a controller (e.g., as described below with regard to FIG. 2) of the circuit board 109. The imaging system 110 is also operably coupled with the circuit board 109. In some embodiments, the imaging system 110 includes a light-detecting sensor or imager operatively coupled to, or mounted on, the circuit board 109 as shown in FIG. 2. Depending on the implementation, the imager may be or include a monochrome camera, a color camera, a camera with monochrome and color functionality, etc. In some implementations, the imaging system 110 includes multiple imagers (e.g., a monochrome camera and a color camera, two color cameras, a camera with multiple imaging sensors and/or functionalities (e.g., both monochrome and color functionality), etc.). In some such implementations, the multiple imagers can be disposed close to one another, separated from one another, on different sides of the imaging engine device 106, etc. In implementations in which the imaging system 110 includes a monochrome camera/sensor, the monochrome camera/sensor includes a long-range (e.g., telescopic) sensor for long distance scanning (e.g., more than 1 foot away, more than 5 feet away, more than 10 feet away, etc. for 100% UPC and 20 mil Datamatrix codes).

In further implementations, the imaging engine device 106 further includes a chassis 150, which in turn includes a body 151 that defines any number of cavities in which components may be partially or fully disposed. For example, the aiming module 170 and/or the illumination module 180 may be at least partially disposed within the cavity of the chassis 150. The aiming module 170 may include components to generate a pattern or similar visual indication such as an aiming dot to assist with identifying where the imaging system 110 is aiming. In some examples, the aiming module 170 may include laser and/or light emitting diode ("LED") based illumination sources. The illumination module 180 assists with illuminating the desired target for the imaging system 110 to accurately capture the desired image. The illumination module 180 may include an LED or an arrangement of LEDs, lenses, and the like.

It will be understood that, although FIGS. 1A-1D illustrate a mobile indicia reader 100, other designs are contemplated. For example, a barcode scanning gun, an imaging kiosk, and/or other such devices may be contemplated. In some such implementations, the imaging device includes the imaging engine device 106. In further implementations, the components of the imaging device are built into the imaging device (e.g., are not modular as the imaging engine device 106 may be). In still further implementations, the imaging device includes the imaging engine device 106, and the imaging engine device may be modular or may be more permanently fixed within the imaging device.

Referring next to FIG. 2, a block diagram of an example architecture for an imaging device such as mobile indicia reader 100 is shown. For at least some of the reader implementations, an imaging assembly of the imaging device 200 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imager 241 over a field of view along an imaging axis 246 through the window 208. The imager 241 may also include and/or function as a mono-chrome sensor and, in further implementations, a color sensor. It should be understood that the terms "imager", "image sensor", and "imaging sensor" are used interchange-ably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is asso-ciated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241. It will be understood that, although the aiming light assembly and the illumination light assembly both provide light, an aiming light assembly differs from the illumination light assembly at least in the type of light the component provides. For example, the illumination light assembly provides diffuse light to suffi-ciently illuminate an object 118 and/or an indicia of the object 118 (e.g., for image capture). An aiming light assem-bly instead provides a defined illumination pattern (e.g., to assist a user in visualizing some portion of the FOV). Similarly, in some implementations, the illumination light source 251 and the aiming light source 223 are active at different, non-overlapping times. For example, the illumi-nation light source 251 may be active on frames when image data is being captured and the aiming light source 223 may be active on frames when image data is not being captured (e.g., to avoid interference with the content of the image data).

In further implementations, the imaging device 200 may additionally emit an auditory cue, such as a chime, beep, message, etc. In still further implementations, the imaging device 200 may provide haptic feedback to a user, such as vibration (e.g., a single vibration, vibrating in a predeter-mined pattern, vibrating synchronized with flashing, etc.).

Further, the imager 241, the illumination light source 251, and the aiming light source 223 are operatively connected to a controller or programmed controller 258 (e.g., a micro-processor facilitating operations of the other components of imaging device 200) operative for controlling the operation of these components. In some implementations, the control-ler 258 functions as or is communicatively coupled to a vision application processor for receiving, processing, and/or analyzing the image data captured by the imager 241.

A memory 260 is connected and accessible to the con-troller 258. Preferably, the controller 258 is the same as the one used for processing the captured return light from the illuminated object 118 to obtain data related to the object 118. Though not shown, additional optical elements, such as collimators, lenses, apertures, compartment walls, etc. may be provided in the housing (e.g., as described above with regard to FIGS. 1A-1D). Although FIG. 2 shows the imager 241, the illumination light source 251, and the aiming light source 223 as being mounted on the same PCB 242, it should be understood that different implementations of the imaging device 200 may have these components each on a separate PCB, or in different combinations on separate PCBs. For example, in an implementation of the imaging device 200, the illumination LED source is provided as an off-axis illumination (i.e., has a central illumination axis that is not co-axial with the central FOV axis).

Figure 3A:
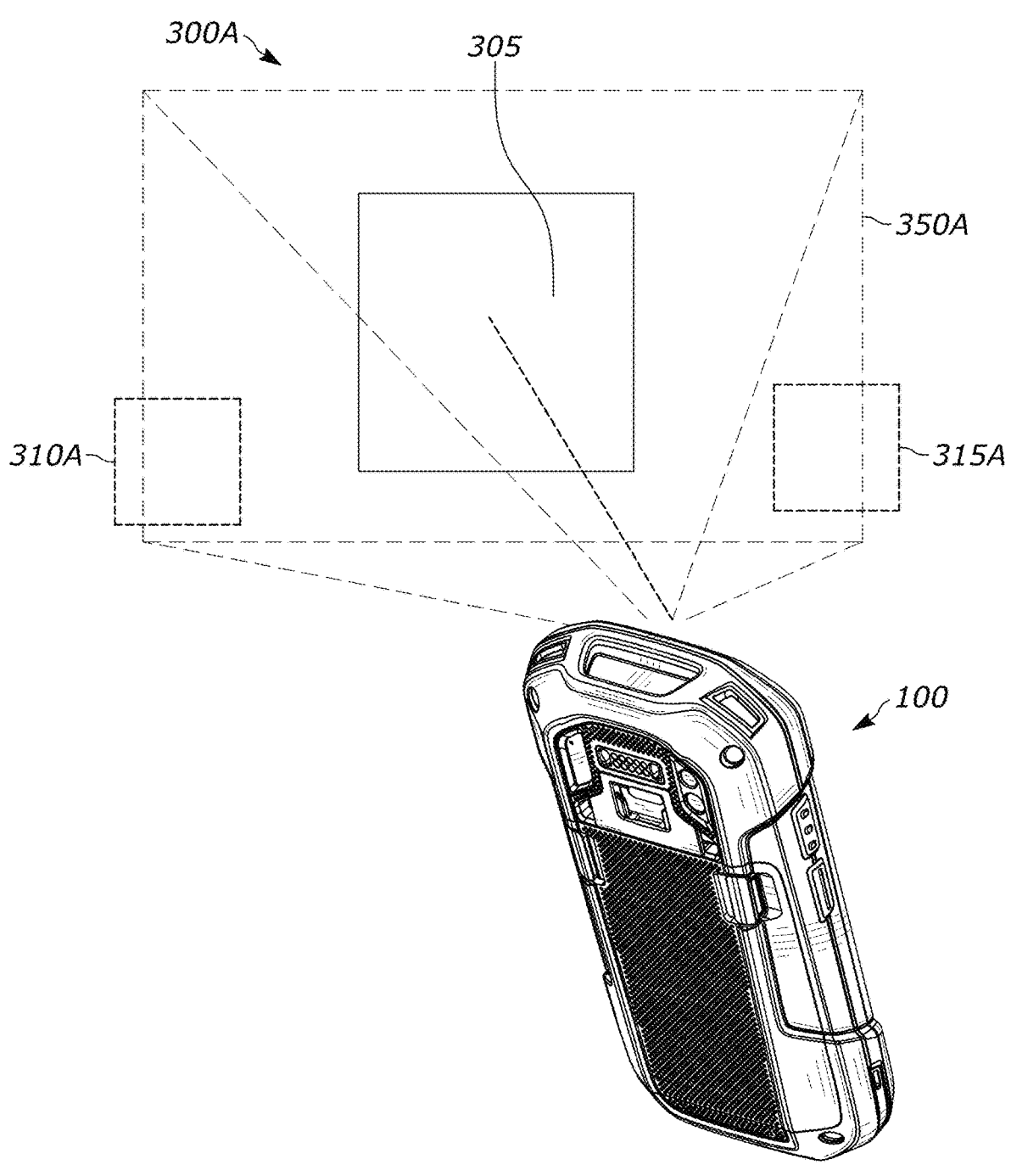
FIG. 3A illustrates an image of an object to have a barcode be decoded by an example imaging device such as the example mobile device barcode reader of FIGS. 1A-2.
Figure 3B:
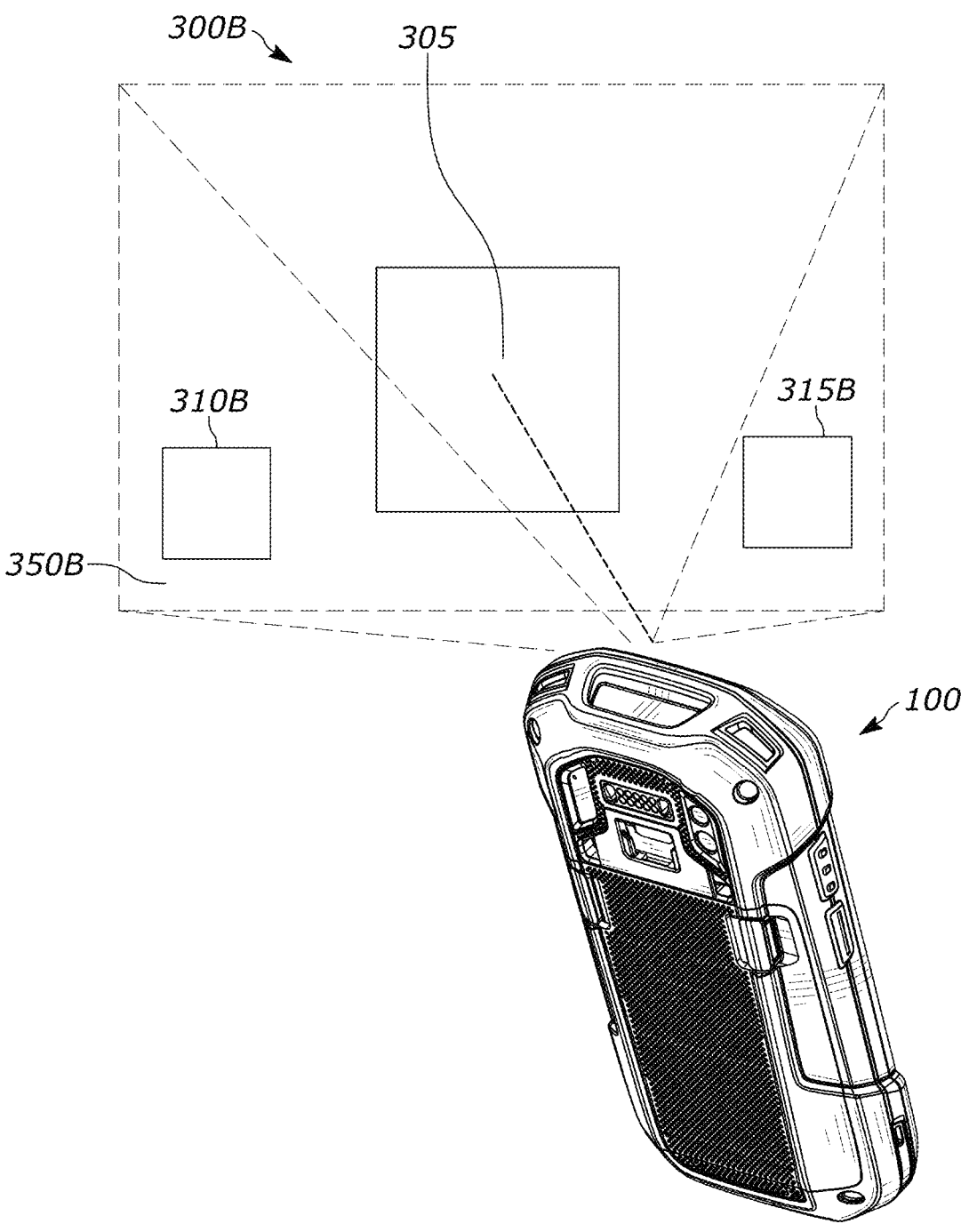
FIG. 3B illustrates an image similar to that of FIG. 3A, but in which the example imaging device captures the FOV for a color image to be associated with the decoded barcode data of FIG. 3A.

In the example of FIGS. 3A and 3B, the imaging device 200 captures scan data in a scenario 300A and image data in a scenario 300B of an object 305. In particular, the imaging device 200 uses a first sensor (e.g., a monochrome camera, a color camera with scanning functionality, etc.) to scan and/or decode an indicia (e.g., a barcode, QR code, 2D barcode, watermark, etc.) associated with the object 305 with a scanning FOV 350A. Depending on the implemen-tation, other objects (e.g., object 310A and/or object 315A) may be in the scanning FOV 350A but may be ignored by the imaging device 200.

FIG. 3B similarly illustrates a scenario in which the imaging device 200 captures image data of the object 305. Similarly to FIG. 3A, the imaging device 200 captures the image data of the object 305 within a FOV 350B. Depending on the implementation, the FOV 350B may be the same size as or a different size than the FOV 350A of FIG. 3A. In further implementations, the FOV 350B may originate from (and therefore the imaging device 200 may use to capture the image data) a same image sensor (e.g., a camera) as the FOV 350A, a different image sensor than the FOV 350A, and/or a different functionality of a same image sensor as the FOV 350A. Depending on the implementation, the image data may include additional objects, such as object 310B and/or 315B. Depending on the implementation, the imaging device 200 may detect and/or ignore the additional object 310B and/or object 315B.

Figure 4:
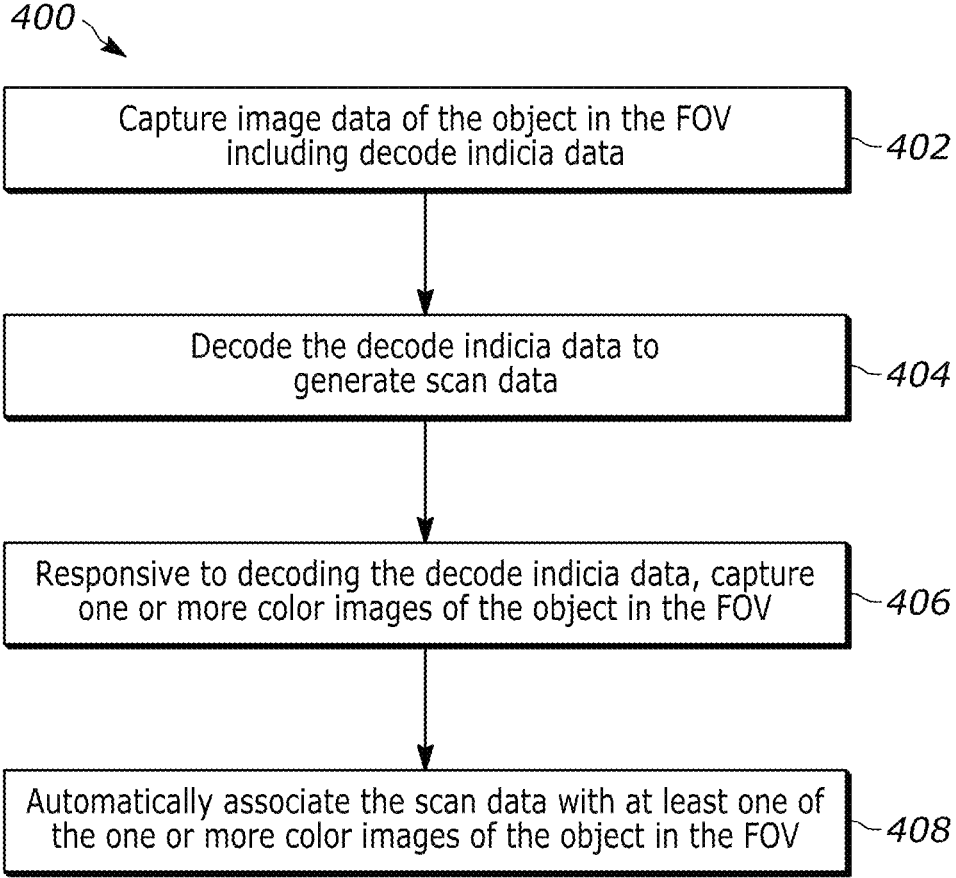
FIG. 4 illustrates a flow diagram of an example method to associate color image data with a scanned and decoded barcode, such as that depicted in FIGS. 1A-3B.

Referring next to FIG. 4, the method 400 illustrates a flow diagram of an example method for generating a decoded payload of an indicia on an object such as object 118 (e.g., as described above with regard to FIG. 3A), capturing color image data of the object (e.g., as described above with regard to FIG. 3B), and associating the decoded payload with the color image data. Although the method 400 is described below with regard to imaging device 200 and components thereof as illustrated in FIG. 2, it will be understood that other similarly suitable imaging devices and/or components may be used instead (e.g., mobile indicia reader 100, imaging engine device 106, etc.).

At block 402, the imaging device 200 captures image data of an object in the FOV of the imaging device. The image data includes decode indicia data. In some implementations, the imaging device 200 includes a monochrome camera and/or other such scanning device for capturing the decode indicia data. In further implementations, the imaging device 200 includes one or more cameras with combined function-ality for monochromatic imaging and color imaging (e.g., a color camera to perform monochromatic imaging and a different color camera to perform color imaging, a color camera to perform both monochromatic imaging and color imaging, etc.). Depending on the implementation, engine At block 404, the imaging device 200 decodes the decode indicia data to generate scan data associated with the object. In some implementations, the imaging device 200 decodes the image data responsive to capturing the image data. In further implementations, the imaging device 200 decodes the image data responsive to capturing a color image of the object (e.g., as described below with regard to block 406). In still further implementations, the imaging device 200 decodes the image data responsive to detecting that the imaging device 200 is in the correct geographical location (e.g., as described in more detail below with regard to block 408).

In some implementations, the imaging device 200 indi-cates that the scan is successful and/or fails. For example, the imaging device 200 may display a message to the user, emit an audio cue that differs depending on whether the operation succeeded, etc. In some such implementations, if the operation fails, then the imaging device 200 may prompt the user to try again before proceeding to block 406.

At block 406, the imaging device 200 captures one or more color images of the object in the FOV. In some implementations, the imaging device 200 captures the one or more color images responsive to decoding the decode indi-cia data. In some such implementations, the imaging device 200 captures the one or more color images using a color camera and/or other such image capture device. Depending on the implementation, the color camera and the mono-chrome camera may be part of a same imaging assembly and/or separate, dedicated imaging assemblies.

In some implementations, the imaging device 200 cap-tures a predetermined quantity of color images (e.g., 1 image, 5 images, 10 images, etc.) the one or more color images. In further implementations, the imaging device 200 captures the one or more color images continuously until a color image of the one or more color images meets the predetermined criterion (e.g., a sharpness criterion, a size/resolution criterion, a content criterion, etc.).

At block 408, the imaging device 200 automatically associates the scan data with at least one of the one or more color images of the object in the FOV. In some implemen-tations, the imaging device 200 associates the scan data with at least one of the one or more color images of the object when at least one of the color images meets a predetermined criterion. For example, the predetermined criterion may be a sharpness criterion (e.g., meeting a predetermined blurri-ness threshold to ensure a clear image), a location criterion, a brightness criterion, etc.

In some such implementations, the imaging device 200 associates the scan data by determining a subset of the at least one of the one or more color images with a metric that meets the criterion (e.g., a sharpness metric that meets the sharpness criterion) and associates a color image of the subset with the scan data, wherein the color image being associated has the highest sharpness metric of the subset of color images. In further such implementations, the imaging device 200 associates the scan data with the at least one of the one or more color images by detecting that a first color image of the one or more color images meets the criterion (e.g., the sharpness criterion) and, in response, associates the first color image with the scan data.

In further implementations, the imaging device 200 asso-ciates additional information (e.g., metadata, additional scan data, additional image data, etc.) with the scan data and the color image(s). For example, in some embodiments, the imaging device 200 retrieves global positioning system (GPS) coordinates for the imaging device 200. The imaging device 200 may then associate the GPS coordinates with the scan data and the at least one of the one or more color images (e.g., responsive to associating the scan data and the color image(s), responsive to the color image(s) meeting the predetermined criterion, etc.). In some such implementa-tions, the imaging device 200 may include a GPS compo-nent, and the imaging device 200 may retrieve the GPS coordinates from the GPS component. In further implemen-tations, the imaging device 200 may retrieve the GPS coordinates from another device (e.g., a wearable GPS device and/or a mobile device) instead. Depending on the implementation, the imaging device 200 may associate the GPS coordinates with the scan data and the at least one of the one or more color images by appending metadata associated with the GPS coordinates with the scan data and the color image(s).

It will be understood that, in some implementations, the imaging device 200 may associate additional information in additional to and/or in place of the GPS coordinates. For example, an indication of one or more surrounding items in the picture (e.g., a captured house address number), notes by the delivery driver, etc. may be included.

Figure 5:
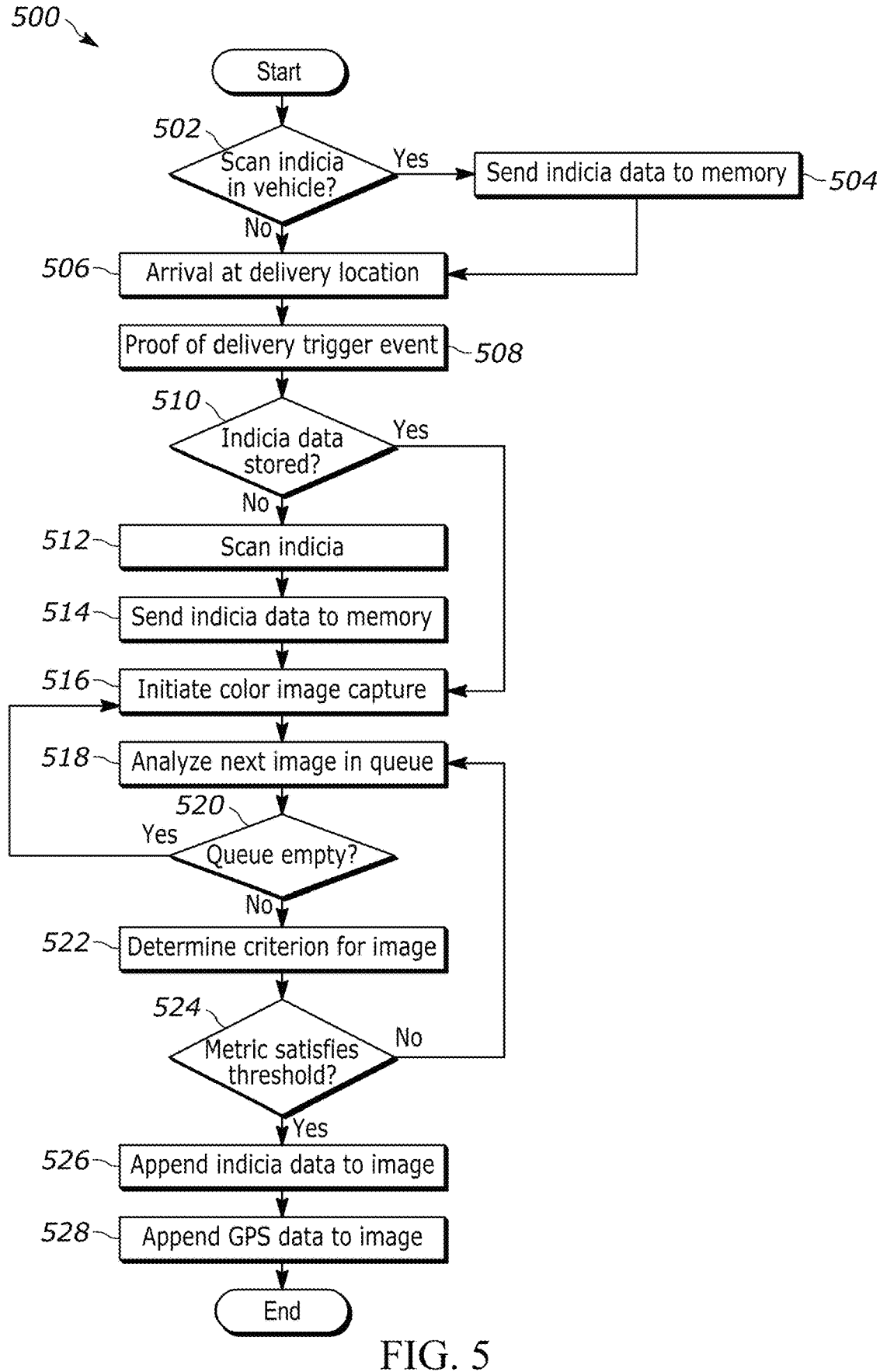
FIG. 5 illustrates a flow diagram of an example detailed method for generated decoded barcode/indicia data, appending the decoded data to a captured color image, and appending global positioning system (GPS) data to the combination of data.

Referring next to FIG. 5, the method 500 illustrates a flow diagram of an example method for generating a decoded payload of associating a proof of delivery image with a decoded indicia and/or GPS data, similar to the method 400 described above with regard to FIG. 4. Although the method 500 is described below with regard to imaging device 200 and components thereof as illustrated in FIG. 2, it will be understood that other similarly suitable imaging devices and/or components may be used instead (e.g., mobile indicia reader 100, imaging engine device 106, etc.).

At block 502, the flow of method 500 diverges based on whether a user has previously scanned an indicia associated with the object 118 (e.g., while in the vehicle, while walking to the delivery point, when initially loading a vehicle, etc.) or not. If so, flow proceeds to block 504, where the imaging device 200 sends the decoded indicia data to a memory (e.g., of the imaging device 200, to a communicatively coupled computing device, to a database, etc.). In some implementations, the imaging device 200 stores the indicia data in the memory for a predetermined period of time (e.g., until a timeout occurs) and/or until a new scan is detected and the data is replaced. In further implementations, the imaging device 200 stores the indicia data in the memory until the imaging device 200 passes a threshold distance form a delivery location (e.g., determined by GPS coordinates, movement speed, etc.).

After block 504 or if the user has not scanned the indicia, the flow proceeds to block 506, where the user and the imaging device 200 arrive at a delivery location. In some implementations, the imaging device 200 includes a GPS component to determine when the imaging device 200 and user arrive at the delivery location (e.g., by comparing to a street address using the GPS coordinates, by determining the device has similar/the same GPS coordinates for a predetermined period of time, etc.). In further implementations, the imaging device 200 is communicatively coupled with a computing device to determine a GPS location and/or coordinates and receives an indication of location (e.g., continuously, upon arrival at the delivery location, upon arrival within a predetermined range of the delivery location, etc.). In still further implementations, the imaging device 200 determines and/or receives an indication of the GPS location at a later point within method 500 (e.g., when triggering the proof of delivery at block 508, when appending indicia data to the image at block 526, immediately prior to and/or part of appending GPS data to the image at block 528, etc.).

At block 508, a trigger event occurs with the imaging device 200 to initiate a proof of delivery event. Depending on the implementation, the trigger event may be or include a physical trigger pull/press, a virtual button press, a voice command, detection of a physical cue (e.g., the object 118), and/or any other such trigger event. At block 510, the imaging device 200 determines whether the indicia data has been stored (e.g., at block 504, at an earlier time, after the trigger event, etc.). If so, then flow proceeds to block 516, where the imaging device 200 initiates color image capture. In some implementations, the image capture is a monochrome image capture instead of and/or in addition to the color image capture. If the imaging device 200 determines that the indicia data is not stored at block 510, then flow proceeds to block 512, where the imaging device 200 scans and/or decodes the indicia from object 118. At block 514, the imaging device then sends the indicia data to memory, similar to block 504. The flow then proceeds to block 516 as described above. In some implementations, blocks 510 through 516 all occur responsive to the proof of delivery trigger event at block 508. As such, the imaging device 200 scans/decodes the indicia and captures the images responsive to a single trigger pull, button press, and/or other such trigger event. In implementations in which the imaging assembly of the imaging device 200 includes a single camera performing the image capture(s), the imaging device 200 may perform the indicia scan and image capture sequentially. In further implementations, such as when the imaging device 200 includes multiple cameras (e.g., a (long range) monochrome camera and a color camera, two color cameras, etc.), the imaging device 200 scans the indicia data and captures the image(s) simultaneously or near-simultaneously.

At block 518, the imaging device 200 determines and/or attempts to analyze the next image in a queue of images. In some implementations, the imaging device 200 captures a predetermined quantity of images at block 516 and populates the queue accordingly. In further implementations, the imaging device 200 continuously captures images and populates the queue until an image is chosen for use (e.g., at blocks 522/524). In still other implementations, the imaging device 200 captures a single image and determines to capture another if the image is not suitable (e.g., as described below with regard to block 524). At block 520, if the queue is empty, then flow returns to block 516, where the imaging device 200 initiates image capture again. Otherwise, flow proceeds to block 522, where the imaging device 200 determines a criterion (e.g., a metric to fulfill a criterion) of the image. For example, if the criterion is image sharpness, then the imaging device 200 determines a blurriness/sharpness of the image and/or of the object 118 in the image. Flow proceeds to block 524, where the imaging device 200 determines whether the corresponding metric for the criterion satisfies a predetermined threshold. For example, if the criterion is sharpness, then the imaging device 200 determines whether the image has a blurriness below a predetermined threshold. If the image does not satisfy the threshold, the flow returns to block 518 where the imaging device 200 determines to analyze the next image in the queue.

If the analyzed image satisfies the threshold, then flow proceeds to block 526, where the imaging device 200 appends the indicia data (e.g., captured and stored at block 504 or 514) to the image that satisfies the threshold. At block 528, the imaging device 200 additionally appends GPS data and/or metadata associated with the GPS data to the image. The imaging device 200 may discard additional images (e.g., by flushing the queue) after determining that an image satisfies the threshold, after appending the indicia data, after appending the GPS data, etc. In further implementations, the imaging device 200 may determine that multiple images have metrics that satisfy the threshold, and may append the indicia data and/or GPS data to all of the images with such metrics, the image with the metric that satisfies the threshold by the most, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device comprising:
one or more processors;
an imaging assembly including at least one imaging sensor having capability to capture monochromatic image data and color image data, the imaging assembly configured to capture image data of an object appearing in a field of view (FOV); and
a computer-readable medium storing machine readable instructions that, when executed, cause the one or more processors to:
capture, via the imaging assembly, image data of the object in the FOV, the image data including decode indicia data;
decode the decode indicia data to generate scan data associated with the object;
responsive to decoding the decode indicia data, capture, via the imaging assembly, one or more color images of the object in the FOV; and
when at least one of the one or more color images of the object in the FOV meets a predetermined criterion, automatically associate the scan data with the at least one of the one or more color images of the object in the FOV,
wherein the computer-readable medium stores further machine readable instructions that, when executed, further cause the one or more processors to:

retrieve global positioning system (GPS) coordinates for the imaging device; and
when the at least one of the one or more color images meets the predetermined criterion, automatically associate the GPS coordinates with the scan data and the at least one of the one or more color images.

2. The imaging device of claim 1, wherein the predetermined criterion is a sharpness criterion.

3. The imaging device of claim 2, wherein associating the scan data with the at least one of the one or more color images includes:
determining a subset of the at least one of the one or more color images with a sharpness metric that meets the sharpness criterion; and
associating a color image of the subset with the scan data, wherein the color image of the subset has a highest sharpness metric of the subset.

4. The imaging device of claim 2, wherein associating the scan data with the at least one of the one or more color images includes:
detecting that a first color image of the one or more color images meets the sharpness criterion; and
responsive to the detecting, associating the first color image with the scan data.

5. The imaging device of claim 1, wherein the imaging device includes a GPS component, and retrieving the GPS coordinates includes:
retrieving the GPS coordinates from the GPS component.

6. The imaging device of claim 1, wherein associating the GPS coordinates with the scan data and the at least one of the one or more color images includes:
appending metadata associated with the GPS coordinates with the scan data and the at least one of the one or more color images.

7. The imaging device of claim 1, wherein capturing the one or more color images includes:
capturing a predetermined quantity of color images.

8. The imaging device of claim 3, wherein capturing the one or more color images includes:
capturing the one or more color images continuously until a color image of the one or more color images meets the sharpness criterion.

9. The imaging device of claim 1, wherein capturing the image data is responsive to a trigger event, and decoding the image data is responsive to capturing the image data.

10. The imaging device of claim 1, wherein the at least one sensor includes at least one of a color sensor or a long-range monochrome sensor.

11. A system comprising:
an imaging engine including an imaging assembly including at least one imaging sensor having capability to capture monochromatic image data and color image data, the imaging assembly configured to capture image data of an object appearing in a field of view (FOV); and
a computer-readable medium storing machine readable instructions that, when executed, cause the system to:
capture, via the imaging assembly, image data of the object in the FOV, the image data including decode indicia data;
decode the decode indicia data to generate scan data associated with the object;
responsive to decoding the decode indicia data, capture, via the color sensor, one or more color images of the object in the FOV; and
when at least one of the one or more color images of the object in the FOV meets a predetermined criterion, automatically associate the scan data with the at least one of the one or more color images of the object in the FOV, wherein the predetermined criterion is a sharpness criterion, wherein associating the scan data with the at least one of the one or more color images includes:

determining a subset of the at least one of the one or more color images with a sharpness metric that meets the sharpness criterion; and associating a color image of the subset with the scan data, wherein the color image of the subset has a highest sharpness metric of the subset.

12. The system of claim 11, wherein associating the scan data with the at least one of the one or more color images includes:

detecting that a first color image of the one or more color images meets the sharpness criterion; and responsive to the detecting, associating the first color image with the scan data.

13. The system of claim 11, wherein the computer-readable medium stores further machine readable instructions that, when executed, further cause the system to:

retrieve global positioning system (GPS) coordinates for the imaging engine; and when the at least one of the one or more color images meets the predetermined criterion, automatically associate the GPS coordinates with the scan data and the at least one of the one or more color images.

14. The system of claim 13, wherein the system includes a GPS component, and retrieving the GPS coordinates includes:

retrieving the GPS coordinates from the GPS component.

15. The system of claim 13, wherein associating the GPS coordinates with the scan data and the at least one of the one or more color images includes:

appending metadata associated with the GPS coordinates with the scan data and the at least one of the one or more color images.

16. The system of claim 11, wherein capturing the one or more color images includes:

capturing a predetermined quantity of color images.

17. The system of claim 11, wherein capturing the one or more color images includes:

capturing the one or more color images continuously until a color image of the one or more color images meets the sharpness criterion.

18. The system of claim 11, wherein capturing the image data is responsive to a trigger event, and decoding the image data is responsive to capturing the image data.

19. The system of claim 11, wherein the at least one sensor includes at least one of a color sensor or a long-range monochrome sensor.

* * * * *